(No Model.)

J. F. A WINKELMANN.
NAILLESS HORSESHOE.

No. 599,085. Patented Feb. 15, 1898.

Witnesses
G. J. Williamson,
Geo. Godding.

Inventor
Johann F. A. Winkelmann.
per Chas. H. Fowler
Attorney

UNITED STATES PATENT OFFICE.

JOHANN FRIEDRICH AUGUST WINKELMANN, OF SCHELL CITY, MISSOURI.

NAILLESS HORSESHOE.

SPECIFICATION forming part of Letters Patent No. 599,085, dated February 15, 1898.

Application filed September 20, 1897. Serial No. 652,290. (No model.)

*To all whom it may concern:*

Be it known that I, JOHANN FRIEDRICH AUGUST WINKELMANN, a citizen of the United States, residing at Schell City, in the county of Vernon and State of Missouri, have invented certain new and useful Improvements in Horseshoes; and I do hereby declare that the following is a full, clear, and exact description of the same, reference being had to the annexed drawings, making a part of this specification, and to the letters of reference marked thereon.

The present invention has relation to that class of horseshoes provided with means for attachment to the hoof without the use of nails; and the object thereof is to materially improve the same, whereby a simple and effective, as well as strong and durable, means are attained for securing the shoe to the hoof, as will be hereinafter described and claimed.

Figure 1:
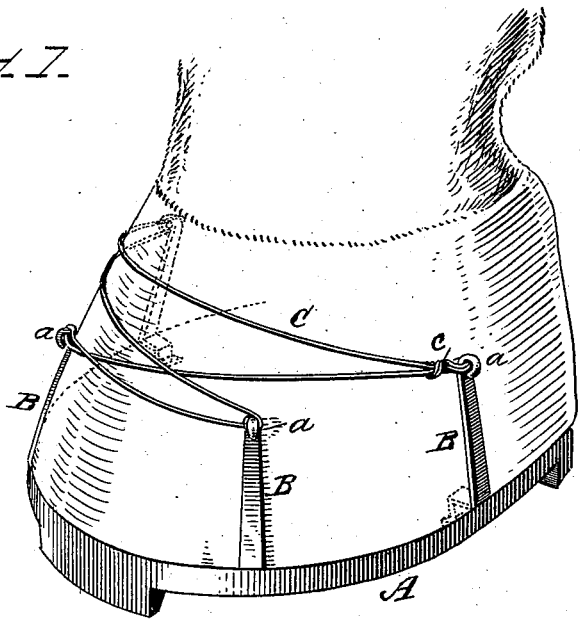
Figure 2:
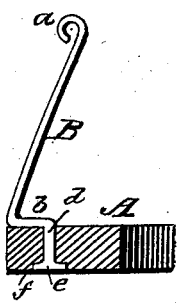

Figure 1 of the drawings is a perspective view of the shoe and its attachments, showing it secured to the hoof. Fig. 2 is a detail sectional view of a portion of the shoe and one of the clamping-bars in elevation.

In the accompanying drawings, A represents a horseshoe of the usual construction, which is provided with a plurality of clamping-bars B, extending up from said shoe. These bars may be secured to the shoe by riveting or by forming screw-threads upon the shank of the bar to engage with a screw-threaded hole in the shoe. In the present instance I have shown the bar as terminating in the shoulder, which has a shank $d$, provided with a head $e$. This shank is without threads and extends through the shoe, the head thereof being seated in a mortise $f$ upon under side of said shoe. As will be seen, passes through the shoe and is not outside thereof, which re-bar becoming loose se were the by bend $b$ gives additional strength to the bar B where it joins the shoe and renders it more durable. The bar extends inwardly from its lower end to its upper end and terminates in an open hook $a$, with which engages a binding-wire C, which wire is brought crosswise around the front of the hoof, as shown in Fig. 1 of the drawings, thus forming a perfect binding of the shoe to the hoof. The ends of the wire after being thus engaged with the hooks upon the ends of the bars and brought around the front of the hoof are fastened by twisting together, as shown at $c$, thereby preventing the wire from working loose after being once drawn tight. Any number of the bars B may be used and placed in any position on the shoe found most advantageous tion on the shoe found most advantageo

Having now fully described my invention, what I claim as new, and desire to secure by Letters Patent, is—

1. A horseshoe provided with upwardly tending clamping-bars, each with a lower eye at its upper end and at its lower end terminating in a right-angle bend upon the shoe and having a shank through the shoe and fastened the a binding-wire engaging with the eyes on the bars, said wire crossing shown to form a secure fastening the shoe to the hoof, substantially the purpose set forth.

2. A horseshoe provided with tending clamping-bars, each eye at its upper end and a right at its lower end to rest upon bend terminating in a shank through the shoe and having in a mortise on the under and a binding-wire engaging or eyes on the bars, substantially the purpose described.

In testimony that I claim hereunto subscribed my of two witnesses.

JOHANN FRIEDRICH